(No Model.)
W. P. TOWNE.
POISON DISTRIBUTER.
No. 400,145. Patented Mar. 26, 1889.
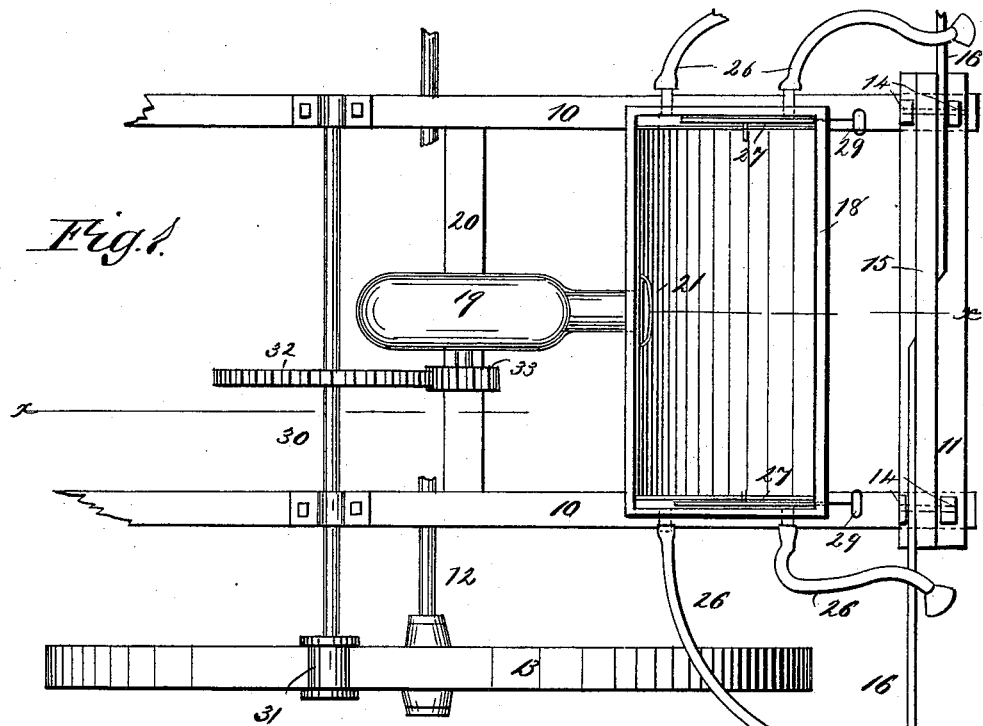
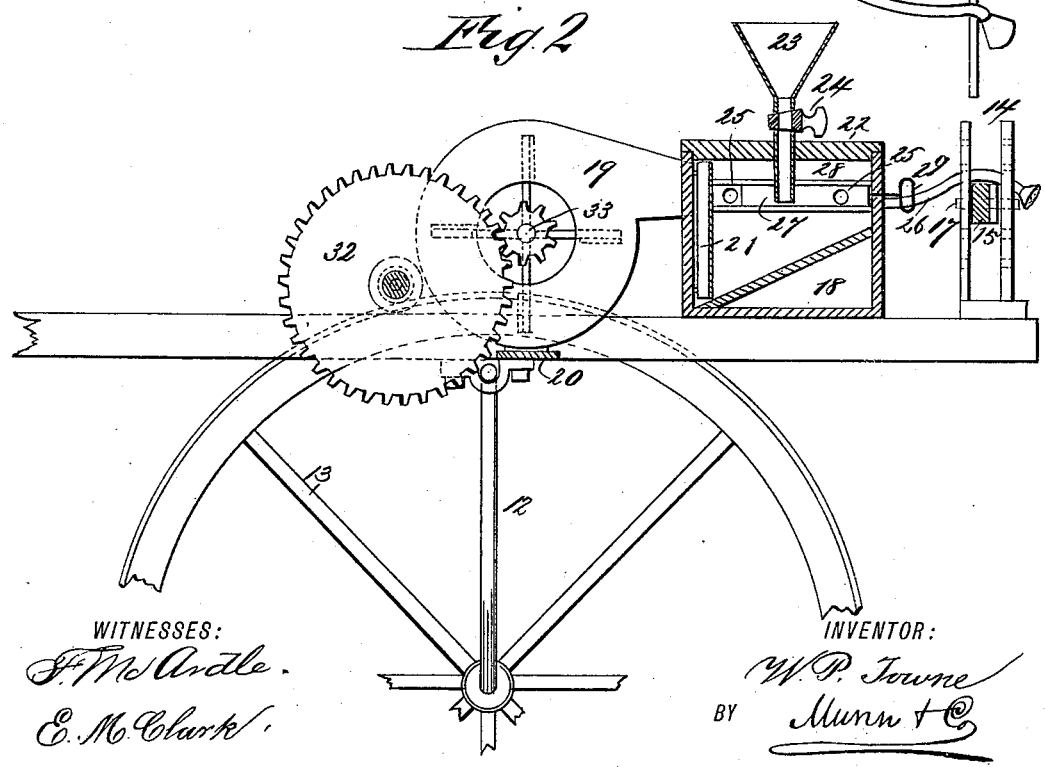
WITNESSES:
F. McArdle
E. M. Clark
INVENTOR:
W. P. Towne
BY Munn & Co.
ATTORNEYS.

UNITED STATES PATENT OFFICE.

WILEY P. TOWNE, OF DELTA, LOUISIANA.

POISON-DISTRIBUTER.

SPECIFICATION forming part of Letters Patent No. 400,145, dated March 26, 1889.

Application filed July 19, 1888. Serial No. 280,383. (No model.)

*To all whom it may concern:*

Be it known that I, WILEY P. TOWNE, of Delta, in the parish of Madison and State of Louisiana, have invented a new and Improved Poison-Distributer, of which the following is a full, clear, and exact description.

My invention relates to an improvement in poison-distributers, and has for its object to provide a device of simple, economical, and durable construction adapted to distribute paris-green and other poisonous powder over plants; and the further object of the invention is to provide a device adjustable to the different widths of rows, and one wherein the powder will be effectually prevented from blowing upon the driver or horses.

The invention consists in the construction and combination of the several parts, as will be hereinafter fully set forth, and pointed out in the claims.

Reference is to be had to the accompanying drawings, forming a part of this specification, in which similar figures of reference indicate corresponding parts in both the views.

Figure 1 is a plan view of my device with the top of the powder-receptacle removed, and Fig. 2 is a longitudinal section taken on line *x x* of Fig. 1.

In carrying out the invention, the frame consists of parallel side pieces, 10, united by suitable cross-bars, 11, at their ends, in which frame an ordinary curved or sulky axle, 12, is journaled, carrying drive-wheels 13. Upon the rearward cross-bar of the frame, over the side beams, 10, spaced standards 14 are secured, and between said standards a bar, 15, is adapted to have vertical movement, to which bar 15, upon opposite sides, horizontal arms 16 are adjustably secured, which arms are adapted to project outward beyond the frame of the device. The arms 16 may be adjusted laterally upon the supporting-bar 15 in any suitable or approved manner, and the said supporting-bar 15 is vertically adjusted in the standards 14 by pins 17, passing through apertures in said standards and through an aperture in each end of the supporting-bar, as best illustrated in Fig. 2. Forward of the supporting-bar, and between said bar and axle 12, a powder-receptacle, 18, is secured upon the frame, and forward of said powder-receptacle a blower, 19, of any suitable or approved construction is attached to a transverse bar, 20, secured to the frame or other equivalent support. The blower 19 is connected with the powder-receptacle 18 at or near the center and preferably near the upper edge. The opening in the powder-receptacle receiving the mouth of the blower is covered by a semicircular shield, 21, said shield extending from the top of the powder-receptacle vertically downward to a point near the bottom, as best illustrated in Fig. 2.

The bottom of the powder-receptacle is inclined from the rear side toward the front, in order that the burden of the contents may be located at the side pierced by the blower. The said powder-receptacle 18 is provided with a detachable top, 22, and through said top a funnel-shaped hopper, 23, is projected, having a suitable faucet, 24, whereby the supply of material from the hopper to the box may be cut off at any time. The inner end of the hopper 23 extends downward, preferably to a point aligning the shield-opening, as best illustrated in Fig. 2, the purpose whereof is to prevent the overfilling of the receptacle 18 and the possible admission of the powder to the blower.

At or near the top of the powder-receptacle 18 spaced horizontally-aligning apertures 25 are produced in each end, and in said apertures a thimble or other equivalent device is secured, purposed for the reception of flexible tubes or hose 26, which tubes are provided with a rose at their ends. A valve or gate, 27, is provided for each set of apertures, consisting of a slide moving transversely in suitable ways, 28, formed upon the inner side of the box, the said slide having formed therein an aperture adapted to register with one of the apertures 25, and as the slide is of less length than the width of the box of the receptacle, when the aperture produced therein registers with one of the apertures 25 the remaining aperture will be uncovered, as best illustrated in Fig. 2. When, however, the slide is carried forward, both of the apertures in the box are closed, the same being effected through the medium of a handle or set-screw, 29, attached to the slide and projected through the powder-receptacle 18 at the rear. The fan of the blower is actuated by a drive-shaft, 30, journaled upon the upper side of the frame, one extremity whereof extends beyond the frame, and to said projecting end a friction-pulley, 31, is secured, engaging with the top of one of the drive-wheels 13, as best shown in Fig. 1. Upon the drive-shaft 30 a toothed wheel, 32, is keyed, which wheel meshes with a pinion, 33, keyed or otherwise secured to the fan-shaft of the blower. Thus in operation, the gates 27 being opened, the air is forced by the blower into the powder-receptacle 18 and conducted by the shield 21 to the bottom of the same. The downdraft causes the powder in the receptacle to be violently agitated and to find an exit through the openings 25 into the several tubes 26, and from thence it is delivered to the plants. By adjusting the arms 16 outward or inward the device may be accommodated to rows of various widths and to plants of various heights, through the medium of the vertical adjustment of the supporting-bar 15.

When the device is in operation, the hose 26 is carried by the arms 16, the ends of the hose carrying the roses being made to project downward a convenient distance in direction of the plants, or in contact with the same, as desired.

It will be observed from the foregoing description, and also by reference to the drawings, that the powder cannot by any possibility escape except through the hose 26, and that as the end of said hose is in contact with or in close proximity to the plants adapted for treatment the said plants receive all of the powder, the wind not having an opportunity to blow the same in direction of either the horses or the driver.

I do not confine myself to the gearing illustrated, as the said gearing may be substituted, for instance, by placing a sprocket-wheel upon the friction-shaft and belting to a small sprocket-wheel, secured to a counter-shaft located beneath the blower, and the blower may be driven by a belt passing around a suitable pulley secured upon the said counter-shaft.

Having thus described my invention, what I claim as new, and desire to secure by Letters Patent, is—

1. In a machine for distributing poison, the combination, with a powder-receptacle having openings at the sides and flexible tubes or hose connected with said openings, of a blower entering said receptacle at or near the top, a downwardly-extending shield covering the blower-opening of the receptacle, and a gate controlling the exit-openings of the said receptacle, as and for the purpose specified.

2. In a machine for distributing poison, the combination, with a powder-receptacle having an inclined bottom and exit-apertures produced in the ends and a gate or valve controlling said exit-apertures, of a blower entering the powder-receptacle at the center and near the top, a shield covering the blower-openings in the receptacle extending vertically downward within a distance of the bottom, and flexible tubes secured in the exit-apertures provided with a rose at the extremity, substantially as shown and described.

3. In a machine for distributing poison, the combination, with a frame, a vertically-adjustable supporting-bar at the rear of said frame, laterally-adjustable arms attached to said supporting-bar, a powder-receptacle adjacent to the supporting-bar, having an inclined bottom, and exit-apertures produced in the sides, of a gate or valve controlling said exit-apertures, a blower leading into the powder-receptacle at or near the top, a downwardly-extending shield covering the blower-opening in the receptacle, and flexible tubes secured within the exit-apertures and supported upon the said arms, substantially as shown and described.

4. In a machine for distributing poison, the combination, with a frame, drive-wheels, a vertically-adjustable supporting-bar at the rear of the frame, arms laterally adjusted to said supporting-bar, a powder-receptacle having an inclined bottom and provided with exit-apertures in the ends, and a valve controlling said apertures, of a blower entering the powder-receptacle at one side, a downwardly-extending shield covering the blower-opening in the receptacle, a pinion attached to the fan-shaft of the blower, a drive-shaft provided with a friction-roller engaging the periphery of the drive-wheel, a gear-wheel secured to said drive-shaft meshing with the pinion, and flexible tubes secured in the exit-openings of the powder-receptacle supported by said arms, substantially as shown and described.

W. P. TOWNE.

Witnesses:
 H. M. FLOYD,
 J. M. SEALE.